United States Patent

[11] 3,573,436

[72] Inventors Robert M. Berler
Westport, Conn.;
Norman Alpert, Scarsdale, N.Y.
[21] Appl. No. 765,771
[22] Filed Oct. 8, 1968
[45] Patented Apr. 6, 1971
[73] Assignee Pitney Bowes-Alpex Inc.
Danbury, Conn.

[54] METHOD AND APPARATUS FOR READING TICKETS, AND TICKET FOR USE THEREWITH
2 Claims, 4 Drawing Figs.

[52] U.S. Cl. 235/61.12N, 235/61.11E
[51] Int. Cl. G06k 19/06, G06k 7/14
[50] Field of Search 235/61.12, 61.12 (NGS), 61.115

[56] References Cited

UNITED STATES PATENTS 2,224,646 12/1940 Friedman 235/61.12NP
2,337,553 12/1943 Hofgaard 235/61.12NP
2,779,540 1/1957 Hoeppner 235/61.12M
2,784,392 3/1957 Chaimowicz 235/61.12M
3,052,564 9/1962 Kulesza 235/61.12M
3,246,126 4/1966 Schlieben 235/61.115
3,463,906 8/1969 Chiang 235/61.115
3,480,762 11/1969 Del Vecchio 235/61.115

*Primary Examiner*—Daryl W. Cook
*Assistant Examiner*—Robert M. Kilgore
*Attorney*—Breitenfeld & Levin

ABSTRACT: Ticket printed by a conventional computer printer includes, in addition to usual information, markings arranged according to a predetermined code on a portion of the ticket in rows and columns. The greatest possible number of markings per inch in each row and column are related to the number of characters per inch in each row and column, respectively, printed out by the computer printer. The ticket is read by advancing it at constant speed past a means, such as a bank of photoelectric cells equal in number to the number of columns of markings, capable of producing an electric signal in response to sensing the markings.

FIG. 1
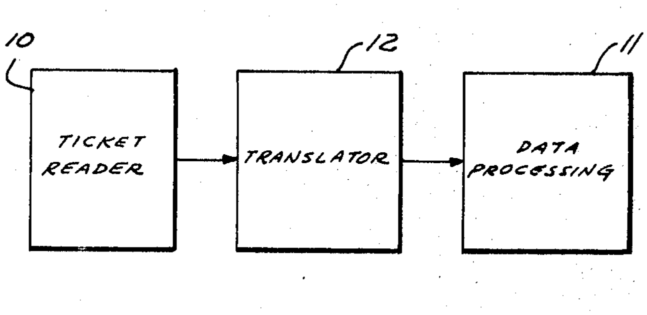
FIG. 2, FIG. 3
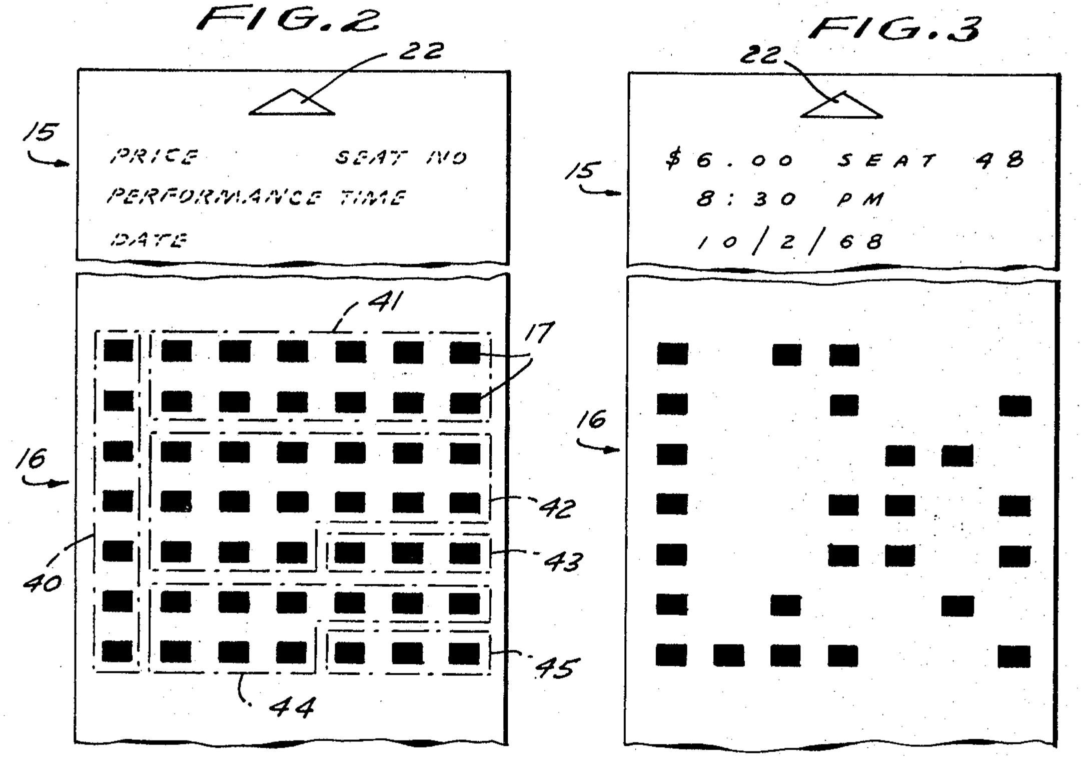
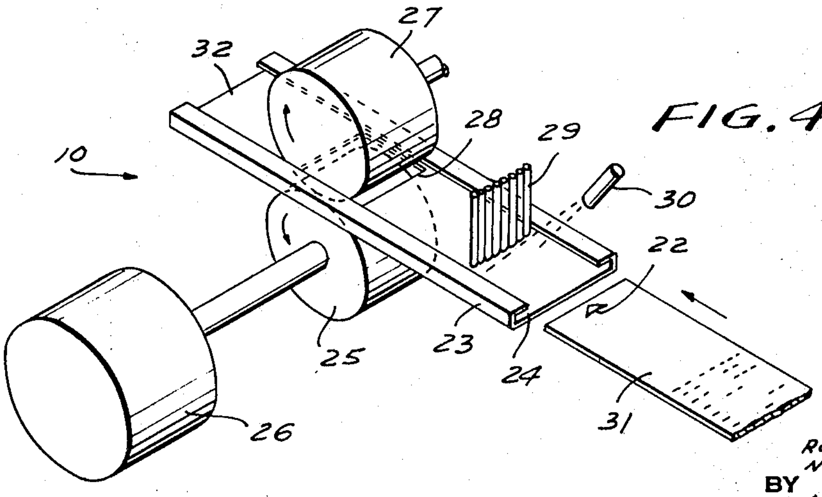
INVENTORS:
ROBERT M. BERLER
NORMAN ALPERT
BY Breitenfeld & Levine
ATTORNEYS

METHOD AND APPARATUS FOR READING TICKETS, AND TICKET FOR USE THEREWITH

This invention relates to tickets bearing information which may be read by a machine, so that at some appropriate time after the ticket is printed, such as during a commercial transaction, information may be read from the ticket and automatically transmitted for example, to a computer storage.

It is known to provide tickets, such as inventory control tickets attached to articles of merchandise in stores, with coded information in the form of a pattern of perforations which can be read by a machine. However, special perforating apparatus is required to produce such tickets. It is also necessary, in many cases, to provide the tickets bearing the coded information with printed information readily intelligible to a person viewing the ticket.

Furthermore, it is becoming more and more popular to print tickets of all kinds by means of computers provided with standard printout units, and these units ordinarily do not do perforating.

To avoid the necessity of performing two separate operations on each ticket, namely, a printing operation and a perforating operation, it is an object of the present invention to provide a ticket, as well as a method and apparatus for reading it, which contains conventional printed information and printed coded information, both of which may be printed at the same time by a standard computer printer.

To accomplish this objective, we have conceived of providing on a portion of each ticket a pattern of markings according to a predetermined code, the markings being arranged within a framework of rows or lines and columns. Furthermore, the greatest possible number of markings which can appear in any row equals one-half the number of characters per inch which are printed in a single line by the computer printer. Also, the greatest number of markings in any column equals the number of lines per inch which are printed by the printer. Thus, without altering a conventional computer printer in any way, it will be capable of printing tickets according to this invention with both ordinary and coded information.

The apparatus for reading the coded information includes a series of sensors, such as photoelectric cells, there being one sensor for each column of markings. A ticket is advanced at a constant speed, and in a longitudinal direction with respect to the columns of marks, past the sensors which produce electrical signals in response to the markings on the ticket. The information contained in the signals may ultimately be transmitted to an information handling system for purposes of inventory control.

Additional features and advantages of the invention will be apparent from the following description in which reference is made to the accompanying drawings.

In the drawings:

FIG. 1 is a block diagram showing how a ticket reader according to this invention might be used:

FIGS. 2 and 3 are fragmentary views showing the faces of tickets provided with coded information according to this invention; and FIG. 4 is a schematic perspective view showing a ticket reading apparatus.

In the following description, the invention will be explained with reference to a theater ticket. However, it is to be understood that the invention is not limited to any particular type of ticket, but instead is useful in any circumstance in which inventory control information which can be read by machine is desired on a ticket.

As one example of the manner in which aspects of the present invention may be carried out, it is contemplated that the ticket read 10 (FIG. 1) may be located in the box office of a theater, and connected to a conventional data processing apparatus 11, located at a remote point, via a conventional translator 12. As each ticket is sold, it is passed through the reader 10, whereby information concerning the price of the ticket, the seat represented by it, the date of the performance, and if applicable the particular performance on that date, is transmitted to the data processing apparatus 11 for storage. At any time, by means of well known apparatus forming no part of this invention, the information stored in the apparatus 11 may be obtained so that it can be determined, for example, which seats have been sold and which remain available.

FIG. 2 illustrates portions of a typical theater ticket. On the face of the ticket, the region indicated by the reference numeral 15 is intended to contain conventional information intelligible to persons handling the ticket. In the region 16, the ticket face is intended to bear coded information in the form of identical markings 17, in the present example rectangular bars. For the sake of illustration, the ticket of FIG. 2 bears, in the region 16, all the possible markings which could be applied to it, so that the framework of the illustrative code scheme may be seen. It will be noted that seven horizontal rows of markings, and seven vertical columns of markings, are employed.

So that the markings 17 may be printed by a conventional computer printer, at the time the usual information in region 15 is printed, the spacing between markings is made identical to normal character spacing. Thus, a computer printer typically prints six lines to the inch, and hence there are six horizontal rows of markings per inch (in FIGS. 2 and 3 the tickets are shown twice actual size). Also, a computer printer usually prints ten characters per inch in each line. Hence, there are five markings and five spacings between markings per inch in each horizontal row. Consequently, each rectangular marking is approximately one-sixteenth inch wide and one-tenth inch long. In addition, the space between each two adjacent markings in any row is about one-tenth inch, and the space between each two adjacent markings in any column is a little less than one-eighth inch. The sizes of the markings, and the spaces between them, are such that strict tolerances in printing the markings are not required.

If desired, each ticket may be provided with an arrow 22 to indicate the direction in which it is to be inserted into the ticket reader 10, shown in FIG. 4. Only the essential elements of the illustrative reader are shown in FIG. 4, and thus a housing which encloses the elements illustrated has not been shown, for the sake of simplicity. The reader includes a generally horizontal C-shaped channel 23, open on top, defining an insert slot 24 and a guide for the ticket as it moves through the reader. Beneath the channel 23 is a driven roller 25, having a suitable friction surface, which may be rotated constantly, in the direction indicated, by a motor 26. An idler roller 27, arranged above the channel 23 and also having a friction surface, engages the driven roller 25 through an opening 28 in the channel.

Spaced in front of the rollers 25 and 27, and above the channel 23, is a bank 29 of photoelectric cells each arranged at the lower end of a hollow tube or pipe. Since, in the present example, each ticket bears seven columns of markings, the bank 29 includes seven photoelectric cells, each arranged to sense the markings in one of the columns. The spacing between the bank of cells 29 and the rollers has been exaggerated for clarity; in practice this spacing may be as small as about one inch. A source of illumination 30 is arranged to direct light downwardly so as to illuminate the code-bearing face of a ticket passing beneath the cell not shown, to the translator 12.

At the time a ticket 31 is sold, the ticket seller inserts the ticket into the slot 24 of the reader until the leading edge of the ticket reaches the nip between rollers 25 and 27. The spacing between the leading edge of the ticket and the first row of markings 17 is greater than the distance between the roller nip and the bank 29 of photoelectric cells, so that the cells do not read the markings while movement of the ticket is under the control of the person handling the ticket. The rollers grasp the ticket between them and propel it at constant speed through the channel 23, delivering the ticket through a delivery slot 32 defined by the far end of the channel. During the movement of the ticket by the rollers, the markings 17 pass beneath the cell bank 29 and each cell senses the markings in its respective column. The rollers need not rotate at particularly high speed since it is adequate if the reading operation takes about one or two seconds. Due to the relatively large spacings between adjacent markings, the photocells can be arranged as much as about one-eight inch from the ticket passing beneath them without danger of misreading the markings, even though the latter are relatively small and printed without tight tolerances. The gap between the photocells and ticket permits ample light to reach the markings from the source 30. It should be noted that the markings on the ticket are sensed by the photoelectric cells prior to the time the markings pass between the rollers. Hence, there is no danger that any smudging of the markings caused by the rollers will interfere with proper reading of the coded information.

A great deal of coded information may be furnished in the small space occupied by the framework of markings 17 shown in FIG. 2. Any number of different codes may be used, of course, but an octal code has been found particularly first, however, that the leftmost column of markings, surrounded by the dot-dash box 40 does not represent any part of the coded information, but serves instead as a clock to indicate that each line has been read. Every ticket, e.g., the ticket of FIG. 3, regardless of the information it carries, will have all seven markings in its left-hand column 40. Thus, even though a particular row may contain no markings, as a result of the information it is provided with, it will certainly contain a clock marking to indicate that the empty row has been sensed by the reader 10. It should also be mentioned that the dot-dash lines in FIG. 2 are used only to differentiate portions of the framework which carry different information; these lines do not actually appear on the ticket.

Referring now to the six right-hand columns of markings 17, in the present example the top two rows, enclosed by the dot-dash box 41, carry the price of the ticket. The twelve markings, or more correctly the twelve positions in which markings may be located, within the box 41 are considered four groups of three marking positions each. In binary notation, each group of three positions can represent any number from zero to seven. Thus, the marking positions within box 41 can represent any octal number from zero to 7,777. The first 7 of this latter number of course represents $7\times8^0=7$. The second 7 represents $7\times8^1=56$. The third 7 represents $7\times8^2=448$, and the fourth 7 represents $7\times8^3=3,584$. Adding these products yields a total of 4,095. Consequently, the markings within box 41 can represent any price ticket from zero to $40.95.

Similarly, the five groups of three marking positions each enclosed by box 42 are capable of representing up to 32,768 different seats in the theater. The group of three marking positions surrounded by box 43 can indicate any of as many as eight different performances on a particular day. The three groups of three marking positions each enclosed by box 44 are used to represent the day of the year on which the performance is given, i.e., any number from one to 366. Finally, the three markings enclosed by box 45 are used to indicate the year of the performance, and are capable of indicating any one of eight different years.

Portions of a typical ticket are shown in FIG. 3. It will be seen that all necessary information about the ticket and the performance it represents appear in conventional form in region 15. The same information appears in coded form in region 16, but it should be noted that the left-hand or clock column contains its complete complement of seven markings.

The invention has been shown and described in preferred from only, and by way of example, and many variations may be made in the invention which will still be comprised within its spirit. It is understood, therefore, that the invention is not limited to any specific form or embodiment except insofar as such limitations are included in the appended claims.

We claim:

1. A ticket containing a plurality of independent items of information in the form of conventional readable characters and a plurality of independent items of information adapted to be read by a machine, said latter information being a plurality of identical markings arranged according to a predetermined code in rows and columns of marking positions on one face of the ticket, the region of the ticket bearing said markings being imperforate, the greatest possible number of said markings per inch in each row being equal to one-half the number of characters per inch in each row forming the information in conventional form, the greatest possible number of markings in each column being equal to the number of characters per inch in each column forming the information in conventional form, one of said columns of markings always containing its full complement of markings so that it can serve as a clock during reading of the ticket, the remaining marking positions being arranged in groups each of which includes a whole number multiple of three marking positions, each of said groups bearing information in binary form identical to one of the items of information in the form of conventional readable characters.

2. A ticket as defined in claim 1 wherein said marking positions are arranged in accordance with an octal code.